US012492640B2

(12) United States Patent
Kray et al.

(10) Patent No.: US 12,492,640 B2
(45) Date of Patent: Dec. 9, 2025

(54) TURBINE ENGINE INCLUDING A VANE SUPPORT AND A VANE

(71) Applicant: General Electric Company, Schenectady, NY (US)

(72) Inventors: Nicholas J. Kray, Mason, OH (US); Aaron M. Gilbert, West Newbury, MA (US); Heidi J. Stegemiller, Franklin, OH (US); Steven R. Manwaring, Lebanon, OH (US); Kohki Nishida, Cincinnati, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/678,281

(22) Filed: May 30, 2024

(65) Prior Publication Data
US 2025/0369361 A1 Dec. 4, 2025

(51) Int. Cl.
F01D 5/28 (2006.01)
F01D 5/14 (2006.01)

(52) U.S. Cl.
CPC ............ F01D 5/282 (2013.01); F01D 5/141 (2013.01); F05D 2300/6033 (2013.01)

(58) Field of Classification Search
CPC ........ F01D 9/042; F01D 25/246; F01D 9/041; F01D 5/26; F01D 5/3092; F01D 11/005; F01D 5/22; F01D 5/225; F01D 25/06; F01D 11/001; F01D 25/005; F01D 25/04; F01D 5/282; F01D 5/147; F01D 5/284; F01D 9/02; F01D 9/04; F01D 11/08; F01D 21/045; F01D 25/28; F01D 5/3007; F01D 5/3084; F01D 11/006; F01D 11/008; F01D 11/125; F01D 11/18; F01D 25/24; F01D 25/26; F01D 5/14; F01D 5/141; F01D 9/00; F05D 2260/30; F05D 2240/80;
(Continued)

(56) References Cited

U.S. PATENT DOCUMENTS 3,071,346 A * 1/1963 Broffitt .................... F01D 9/042
415/137
3,326,523 A * 6/1967 Bobo ...................... F01D 9/042
416/190
(Continued)

FOREIGN PATENT DOCUMENTS

FR 2954797 B1 7/2011

Primary Examiner — Eric J Zamora Alvarez
(74) Attorney, Agent, or Firm — Venable LLP; David D. Leege; Michele V. Frank

(57) ABSTRACT

A turbine engine for an aircraft. The turbine engine includes a vane support and a vane. The vane support has a vane-facing surface. A first hook and a second hook extend from the vane-facing surface and define a channel therebetween. The vane includes an airfoil and an outer band connected to the airfoil. The outer band is positioned in the channel to form a gap between a support-facing surface of the outer band and the vane-facing surface under assembly conditions of the turbine engine. The vane-facing surface and the support-facing surface are shaped to form a contact configuration that occurs when, under an operating condition of the turbine engine, the vane flexes and at least a portion of the support-facing surface contacts the vane-facing surface over a contacting region to eliminate the gap over the contacting region.

20 Claims, 5 Drawing Sheets

(58) Field of Classification Search
CPC ............ F05D 2260/96; F05D 2220/32; F05D 2230/60; F05D 2240/11; F05D 2240/128; F05D 2230/10; F05D 2300/603; F05D 2300/6033; F04D 29/321; F04D 29/34
See application file for complete search history.

(56) References Cited

U.S. PATENT DOCUMENTS

| | | | |
|---|---|---|---|
| 3,423,071 A * | 1/1969 | Noren | F01D 9/042 415/209.2 |
| 6,406,256 B1 * | 6/2002 | Marx | F01D 11/16 415/173.1 |
| 6,517,313 B2 * | 2/2003 | Rogers | F01D 25/246 415/137 |
| 6,736,602 B2 | 5/2004 | Carney | |
| 6,932,566 B2 * | 8/2005 | Suzumura | F01D 11/125 415/137 |
| 7,278,821 B1 * | 10/2007 | O'Reilly | F04D 29/644 415/196 |
| 7,824,167 B2 | 11/2010 | Tsuji et al. | |
| 8,137,071 B2 | 3/2012 | Caucheteux et al. | |
| 8,206,094 B2 * | 6/2012 | Seki | F04D 29/542 415/191 |
| 8,696,311 B2 * | 4/2014 | Eleftheriou | F01D 9/042 415/209.4 |
| 8,826,536 B2 | 9/2014 | Stone | |
| 8,920,116 B2 * | 12/2014 | Wiebe | F01D 25/246 415/209.3 |
| 8,939,717 B1 * | 1/2015 | Lee | F01D 25/246 415/209.2 |
| 9,062,553 B2 | 6/2015 | Baumas et al. | |
| 9,777,594 B2 * | 10/2017 | Lang | F01D 5/22 |
| 9,796,055 B2 * | 10/2017 | Anderson | F01D 5/005 |
| 9,797,262 B2 * | 10/2017 | Richardson | F01D 25/06 |
| 9,803,648 B2 | 10/2017 | Care et al. | |
| 9,982,549 B2 | 5/2018 | Thomen et al. | |
| 10,077,782 B2 * | 9/2018 | Zhang | F01D 11/18 |
| 10,309,235 B2 * | 6/2019 | Jacques | F01D 5/3038 |
| 10,876,417 B2 * | 12/2020 | Edwards | F01D 25/246 |
| 11,085,332 B2 * | 8/2021 | Clark | F01D 25/28 |
| 2008/0019836 A1 * | 1/2008 | Butz | F01D 11/001 416/190 |
| 2010/0068050 A1 * | 3/2010 | Hansen | F01D 9/042 415/209.3 |
| 2010/0150710 A1 * | 6/2010 | Khanin | F01D 11/005 415/208.1 |
| 2014/0255179 A1 * | 9/2014 | Fielding | F01D 9/042 415/208.2 |
| 2016/0201488 A1 * | 7/2016 | Carr | F01D 9/041 29/889.22 |
| 2017/0268367 A1 * | 9/2017 | McCaffrey | F01D 11/12 |
| 2019/0111636 A1 * | 4/2019 | Van Nieuwenhove | B29C 70/38 |

* cited by examiner

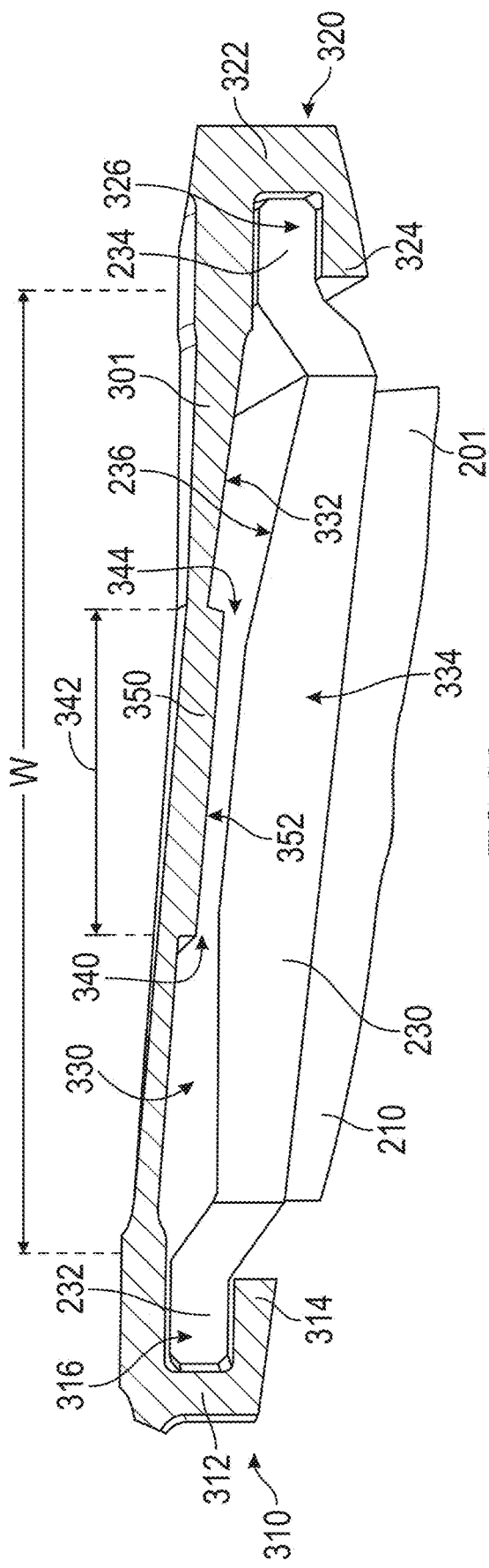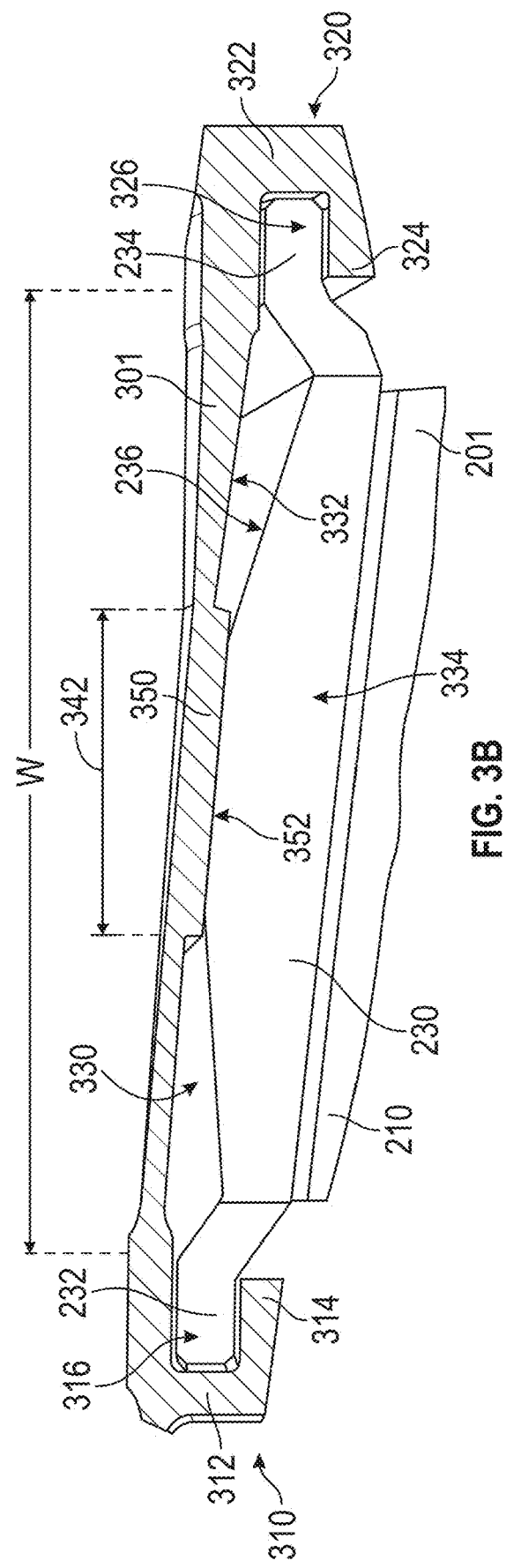
FIG. 3A
FIG. 3B

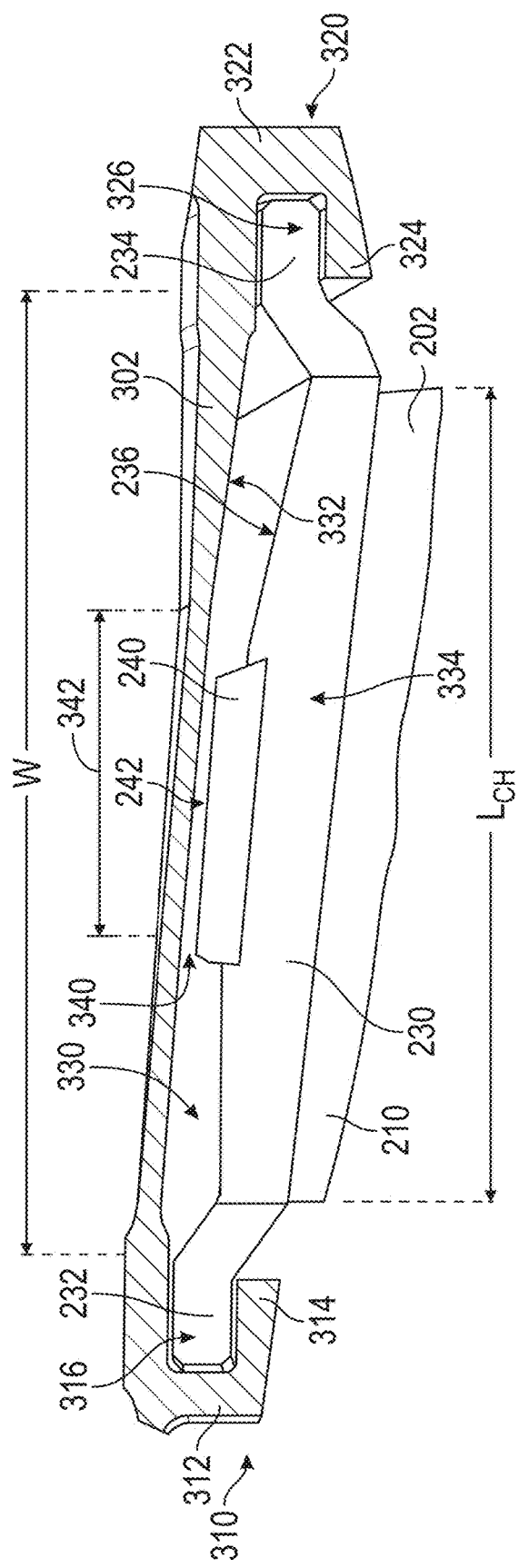
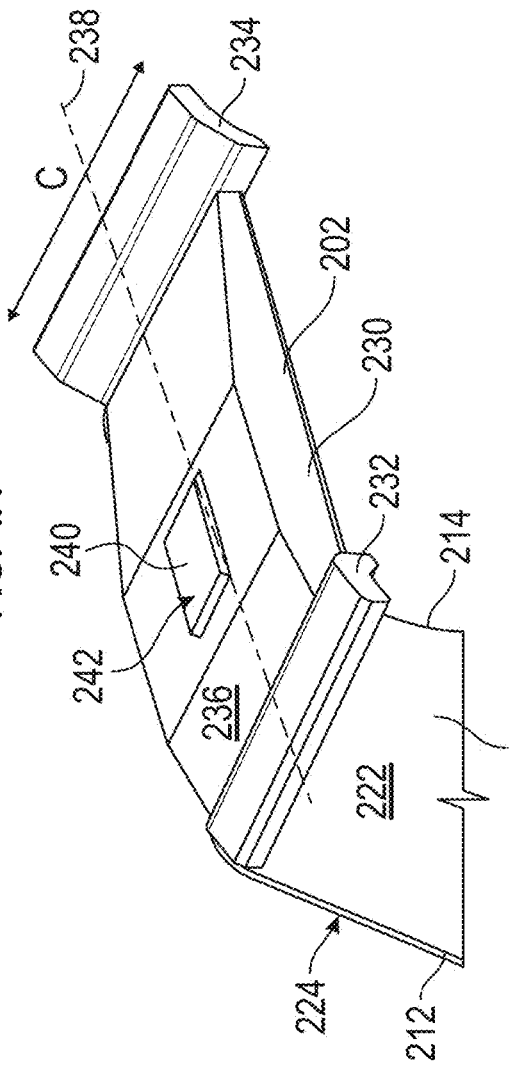
FIG. 4A
FIG. 4B

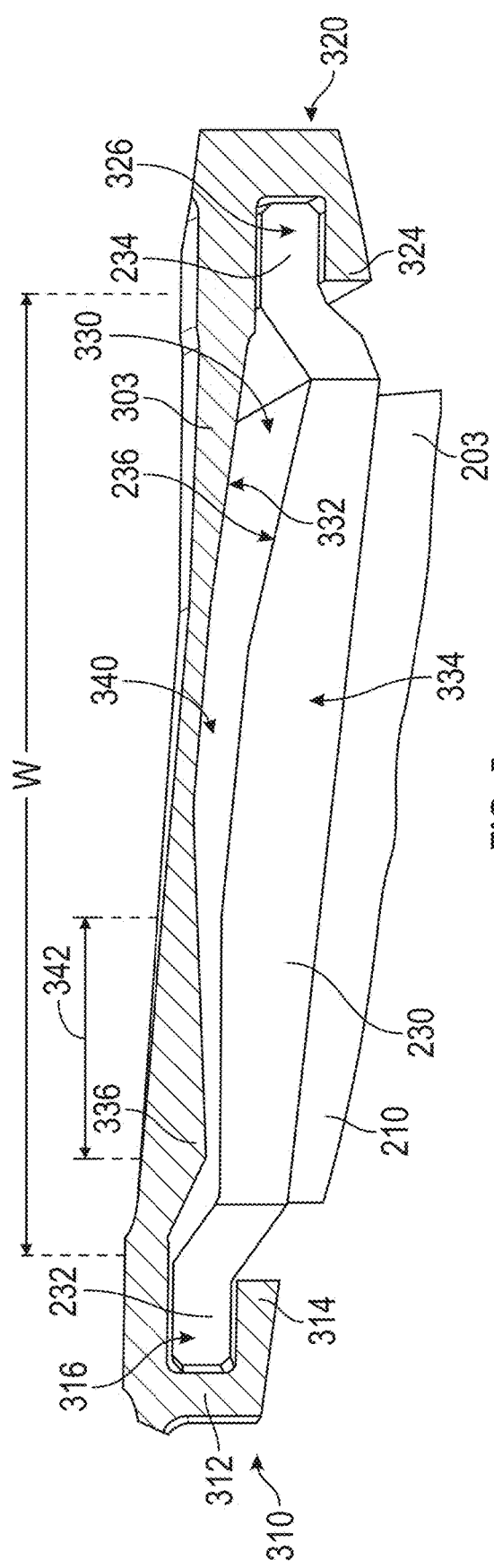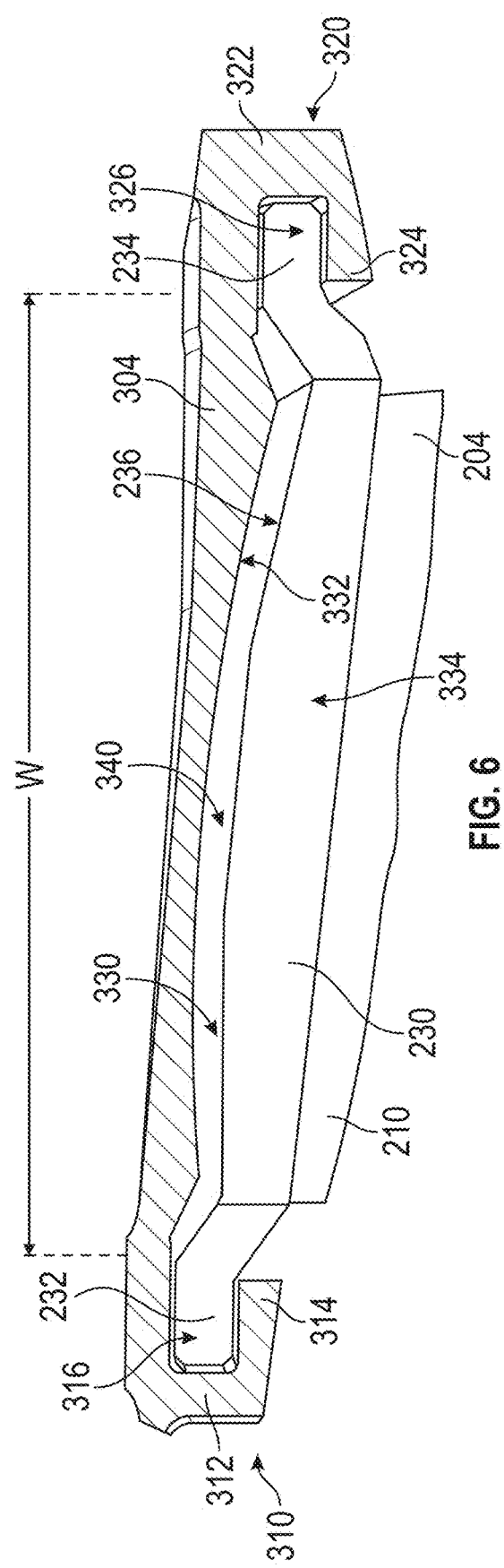

TURBINE ENGINE INCLUDING A VANE SUPPORT AND A VANE

GOVERNMENT INTEREST

This invention was made with United States Government support. The United States Government may have certain rights in the invention.

TECHNICAL FIELD

The present disclosure relates to vane supports and vanes in turbine engines, particularly, turbine engines for aircraft.

BACKGROUND

Turbine engines used in aircraft generally include a fan and a turbo-engine section arranged in flow communication with one another. A combustor is arranged in the turbo-engine to generate combustion gases for driving a turbine in the turbo-engine of the turbine engine, and the turbine may be used to drive the fan. A portion of air flowing into the fan flows through the turbo-engine as core air, and another portion of the air flowing into the fan bypasses the core section and flows through the turbine engine as bypass air. The turbo-engine section may include one or more compressors to compress the core air before the core air flows into the combustor. Composite materials may be used to manufacture various components of the turbine engine, particularly, when the turbine engine is a turbine engine for an aircraft.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 2 shows detail 2 in FIG. 1.

FIGS. 3A and 3B are detail, cross-sectional views of the compressor vane and the portion of a core casing in the turbine engine shown in FIG. 2, showing detail 3A in FIG. 2. FIG. 3A shows the compressor vane under assembly conditions, and FIG. 3B shows the compressor vane in a high stress condition.

FIG. 4A is a detail, cross-sectional view of another configuration of the compressor vane and the portion of a core casing similar to that shown in FIG. 3A. FIG. 4B is a schematic view of the compressor vane shown in FIG. 4A.

FIG. 5 is a detail, cross-sectional view of another configuration of the compressor vane and the portion of a core casing similar to that shown in FIG. 3A.

FIG. 6 is a detail, cross-sectional view of another configuration of the compressor vane and the portion of a core casing similar to that shown in FIG. 3A.

DETAILED DESCRIPTION

Figure 1:
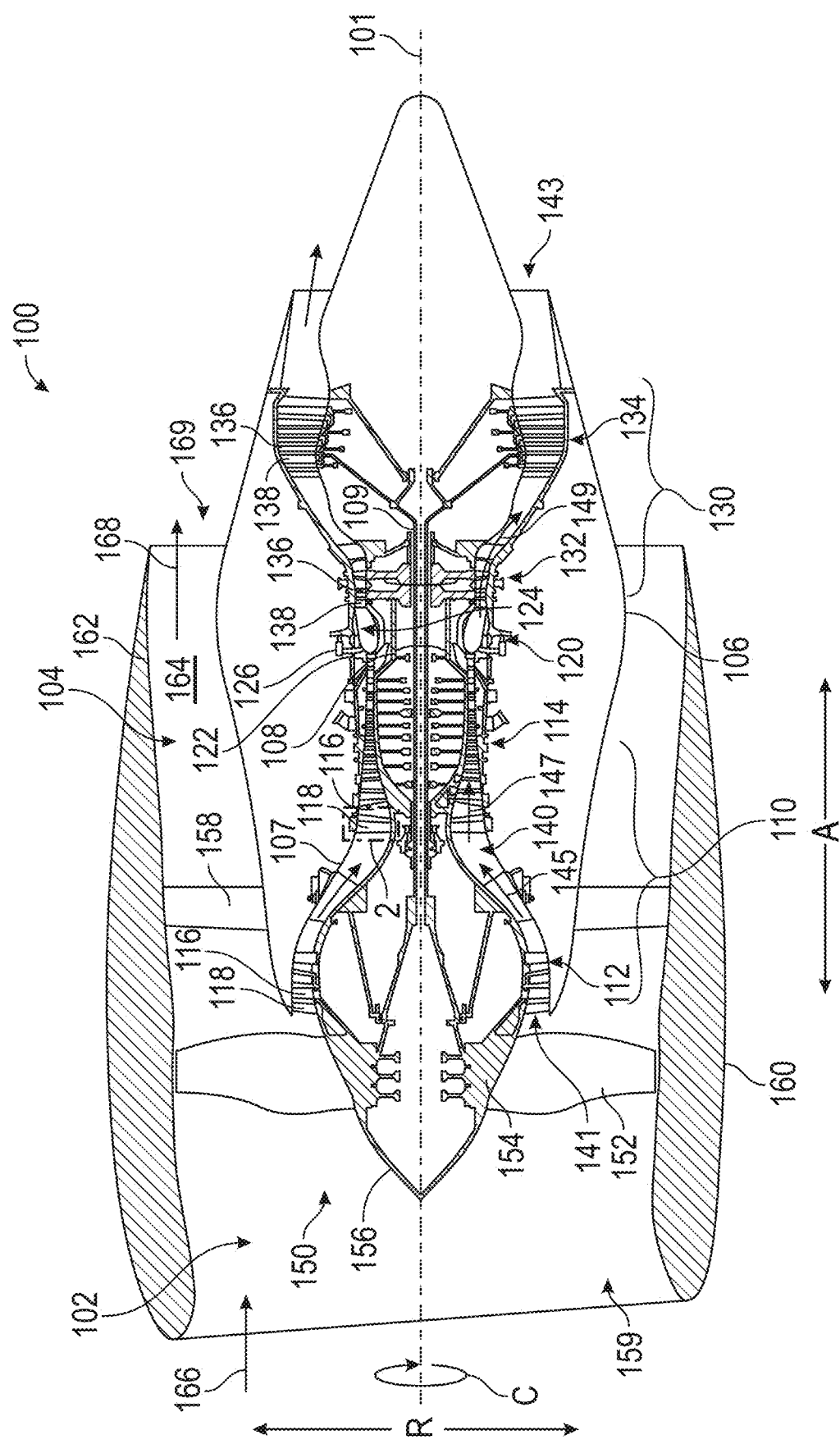
FIG. 1 is a schematic, cross-sectional view of a turbine engine of for an aircraft.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," "third," and the like, may be used interchangeably to distinguish one component from another and are not intended to signify location or importance of the individual components.

As used herein, the terms "low," "mid" (or "mid-level"), and "high," or their respective comparative degrees (e.g., "lower" and "higher", where applicable), when used with compressor, combustor, turbine, shaft, fan, or turbine engine components, each refers to relative pressures, relative speeds, relative temperatures, or relative power outputs within an engine unless otherwise specified. For example, a "low-power" setting defines the engine or the combustor configured to operate at a power output lower than a "high-power" setting of the engine or the combustor, and a "mid-level power" setting defines the engine or the combustor configured to operate at a power output higher than a "low-power" setting and lower than a "high-power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine. A mission cycle for a turbine engine includes, for example, a low-power operation, a mid-level power operation, and a high-power operation. Low-power operation includes, for example, engine start, idle, taxiing, and approach. Mid-level power operation includes, for example, cruise. High-power operation includes, for example, takeoff and climb.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

The singular forms "a," "an," and "the" include plural references unless the context clearly dictates otherwise.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

The term "composite," as used herein, is indicative of a material having two or more constituent materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), and a metal matrix composite (MMC). The composite may be formed of a matrix material and a reinforcing element, such as a fiber (referred to herein as a reinforcing fiber).

As used herein "reinforcing fibers" may include, for example, glass fibers, carbon fibers, steel fibers, or para-aramid fibers, such as Kevlar® available from DuPont of Wilmington, Delaware. The reinforcing fibers may be in the form of fiber tows that include a plurality of fibers that are formed into a bundle.

"Preform" as used herein is a piece of three-dimensional woven fabric formed by a plurality of reinforcing fibers including warp fiber tows and weft fiber tows.

As used herein, a "composite component" refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. The adhesive can require curing at elevated temperatures or other hardening techniques.

As used herein, PMC refers to a class of materials. The PMC material may be a prepreg. A prepreg is a reinforcement material (e.g., a reinforcing fiber) pre-impregnated with a polymer matrix material. Non-limiting examples of processes for producing polymeric prepregs include hot melt pre-pregging in which a molten resin is deposited onto the fiber reinforcement material and powder pre-pregging in which a resin is deposited onto the fiber reinforcement material, by way of a non-limiting example, electrostatically, and then adhered to the fiber, by way of a non-limiting example, in an oven or with the assistance of heated rollers.

Resins for matrix materials of PMCs can be generally classified as thermosets or thermoplastics. Thermoplastic resins are generally categorized as polymers that can be repeatedly softened and caused to flow when heated, and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg with thermoplastic polymers, another non-limiting example utilizes a woven fabric. Woven fabrics can include, but are not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and the reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part.

The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers to a mold or a cavity. The dry fibers can include prepreg, braided material, woven material, or any combination thereof. Resin can be pumped into or otherwise provided to the mold or the cavity to impregnate the dry fibers. The combination of the impregnated fibers and the resin is then cured and removed from the mold. When removed from the mold, the composite component can require post-curing processing. RTM may be a vacuum assisted process. That is, air from the cavity or the mold can be removed and replaced by the resin prior to heating or curing. The placement of the dry fibers also can be manual or automated. The dry fibers can be contoured to shape the composite component or to direct the resin. Optionally, additional layers or reinforcing layers of a material differing from the dry fiber can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to by their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride, SiC/SiC-SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled (e.g., form fiber tows) and/or coated prior to inclusion within the matrix. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or a burn-out to yield a high char residue in the preform, and subsequent melt-infiltration with silicon, or a cure or a pyrolysis to yield a silicon carbide matrix in the preform, and subsequent chemical vapor infiltration with silicon carbide. Additional steps may be taken to improve densification of the preform, either before or after chemical vapor infiltration, by injecting the preform with a liquid resin or a polymer followed by a thermal processing step to fill the voids with silicon carbide. CMC material as used herein may be formed using any known or hereafter developed methods, including but not limited to melt infiltration, chemical vapor infiltration, polymer impregnation pyrolysis (PIP), or any combination thereof.

The term "metallic" as used herein is indicative of a material that includes metal such as, but not limited to, titanium, iron, aluminum, stainless steel, and nickel alloys. A metallic material or a metal alloy can be a combination of at least two or more elements or materials, where at least one is a metal.

As noted above, certain components of gas turbine engines, particularly, those used in aircraft, may be made from composite materials. Such components include, for example, various airfoils including static airfoils, such as vanes, like outlet guide vanes in the bypass airflow path, or nozzles, such as compressor nozzles. When the turbine engine is assembled, these static airfoils may be inserted into a support (such as a vane support) with clearances between the static airfoil and the support to facilitate assembly. In addition, these static airfoils are designed to meet high loading conditions, including, for example, stall, surge, high-G maneuvers, and take off conditions and transfer the load from the static airfoil to the support. While forming these static airfoils from composite materials, particularly, PMCs, have many advantages including weight reduction, such materials may have less rigidity than other materials such as metals. The static airfoils discussed herein include features that allow for an additional load path to transfer loads from the airfoil to the support when the airfoil flexes under the high loading conditions but maintains clearances under assembly conditions.

The static airfoils (or vanes) discussed herein may be particularly suitable for use in turbine engines for aircraft. FIG. 1 is a schematic, cross-sectional view a turbine engine 100 that may be used on an aircraft. The turbine engine 100 has an axial direction A (extending parallel to a longitudinal centerline axis 101, shown for reference in FIG. 1), a radial direction R, and a circumferential direction C. The circumferential direction C extends in a direction rotating about the longitudinal centerline axis 101 (the axial direction A). In the embodiment depicted in FIG. 1, the turbine engine 100 is a high bypass turbofan engine, including a fan section 102 and a turbo-engine 104 disposed downstream from the fan section 102.

The turbo-engine 104 depicted in FIG. 1 includes in serial flow relationship, a compressor section 110, a combustion section 120, and a turbine section 130. The turbo-engine 104 is substantially enclosed within an outer casing 106 that is substantially tubular and defines a core inlet 141. In this embodiment, the core inlet 141 is annular. As schematically shown in FIG. 1, the compressor section 110 includes a booster or a low-pressure (LP) compressor 112 followed downstream by a high-pressure (HP) compressor 114. The combustion section 120 is downstream of the compressor section 110. The turbine section 130 is downstream of the combustion section 120 and includes a high-pressure (HP) turbine 132 followed downstream by a low-pressure (LP) turbine 134. The turbo-engine 104 further includes a core air exhaust nozzle 143 (also referred to as a jet exhaust nozzle) that is downstream of the turbine section 130. The compressor section 110, the combustion section 120, and the turbine section 130 together define, at least in part, a core air flow path 140 extending from the core inlet 141 to the core air exhaust nozzle 143, and through which core air 145 flows. As will be discussed in more detail below, the turbo-engine 104 includes a high-pressure (HP) shaft 108 or a HP spool, and a low-pressure (LP) shaft 109. The HP shaft 108 drivingly connects the HP turbine 132 to the HP compressor 114. The HP turbine 132 and the HP compressor 114 rotate in unison through the HP shaft 108. The LP shaft 109 drivingly connects the LP turbine 134 to the LP compressor 112. The LP turbine 134 and the LP compressor 112 rotate in unison through the LP shaft 109.

Each of the LP compressor 112 and the HP compressor 114 may include a plurality of compressor stages. In each stage, a plurality of compressor blades 116 rotate relative to a corresponding plurality of static compressor vanes 118 (also called nozzles) to compress or to pressurize the core air 145 passing through the stage. In a single compressor stage, the plurality of compressor blades 116 can be provided in a ring, extending radially outwardly relative to the longitudinal centerline axis 101 from a blade platform to a blade tip (e.g., extend in the radial direction R). The compressor blades 116 may be a part of a compressor rotor that includes a disk and the plurality of compressor blades 116 extend radially from the disk. Other configurations of the compressor rotor may be used, including, for example, blisks where the disk and the compressor blades 116 are integrally formed with each other to be a single piece. The corresponding static compressor vanes 118 are positioned upstream of and adjacent to the rotating compressor blades 116. The compressor vanes 118 for a stage of the compressor can be mounted to a core casing 107 in a circumferential arrangement. The core casing 107 may define, at least in part, the core air flow path 140. Each compressor stage may be used to sequentially compress the core air 145 flowing through the core air flow path 140, generating compressed air 147. Any suitable number of compressor blades 116, compressor vanes 118, and compressor stages may be used.

Each of the HP turbine 132 and the LP turbine 134 also may include a plurality of turbine stages. In each stage, a plurality of turbine blades 136 rotate relative to a corresponding plurality of static turbine vanes 138 (also called nozzles) to extract energy from combustion gases 149 passing through the stage. The turbine blades 136 may be a part of a turbine rotor. Any suitable configuration for a turbine rotor may be used, including, for example, a disk with the plurality of turbine blades 136 extending from the disk. The corresponding static turbine vanes 138 are positioned upstream of and adjacent to the rotating turbine blades 136. The turbine vanes 138 for a stage of the turbine can be mounted to the core casing 107 in a circumferential arrangement.

In the combustion section 120, fuel, received from a fuel system (not shown), is injected into a combustion chamber 124 of a combustor 122 by fuel nozzles 126. The fuel is mixed with the compressed air 147 from the compressor section 110 to form a fuel and air mixture, and combusted, generating combustion products (i.e., combustion gases 149). As will be discussed further below, adjusting a fuel metering unit (not shown) of the fuel system changes the volume of fuel provided to the combustion chamber 124 and, thus, changes the amount of propulsive thrust produced by the turbine engine 100 to propel the aircraft. The combustion gases 149 are discharged from the combustion chamber 124. These combustion gases may be directed into the turbine blades 136 of the HP turbine 132 and, then, the turbine blades 136 of the LP turbine 134, and the combustion gases 149 drive (rotate) the turbine blades 136 of the HP turbine 132 and the LP turbine 134. Any suitable number of turbine blades 136, turbine vanes 138, and turbine stages may be used. After flowing through the turbine section 130, the combustion gases 149 are exhausted from the turbine engine 100 through the core air exhaust nozzle 143 to provide propulsive thrust.

The turbine engine 100 and, more specifically, the turbo-engine 104 further includes one or more drive shafts. As noted above, the turbo-engine 104 includes the high-pressure (HP) shaft 108 drivingly connecting the HP turbine 132 to the HP compressor 114, and the low-pressure (LP) shaft 109 drivingly connecting the LP turbine 134 to the LP compressor 112. More specifically, the turbine rotors of the HP turbine 132 are connected to the HP shaft 108, and the compressor rotors of the HP compressor 114 are connected to the HP shaft 108. The combustion gases 149 are routed into the HP turbine 132 and expanded through the HP turbine 132 where a portion of thermal energy or kinetic energy from the combustion gases 149 is extracted via the one or more stages of the turbine blades 136 and turbine vanes 138 of the HP turbine 132. This causes the HP shaft 108 to rotate, thereby supporting operation of the HP compressor 114 (self-sustaining cycle) and rotating the compressor rotors and, thus, the compressor blades 116 of the HP compressor 114 via the HP shaft 108. In this way, the combustion gases 149 do work on the HP turbine 132. The combustion gases 149 are then routed into the LP turbine 134 and expanded through the LP turbine 134. Here, a second portion of the thermal energy or the kinetic energy is extracted from the combustion gases 149 via one or more stages of the turbine blades 136 and the turbine vanes 138 of the LP turbine 134. This causes the LP shaft 109 to rotate, thereby supporting operation of the LP compressor 112 (self-sustaining cycle), and rotating the compressor rotors and, thus, the compressor blades 116 of the LP compressor 112 via the LP shaft 109. In this way, the combustion gases 149 do work on the LP turbine 134. The HP shaft 108 and the LP shaft 109 are disposed coaxially about the longitudinal centerline axis 101. The HP shaft 108 has a diameter greater than that of the LP shaft 109, and the HP shaft 108 is located radially outward of the LP shaft 109. The HP shaft 108 and the LP shaft 109 are rotatable about the longitudinal centerline axis 101 and, as discussed above, coupled to rotatable elements such as the compressor rotors and the turbine rotors.

The fan section 102 shown in FIG. 1 includes a fan 150 having a plurality of fan blades 152 coupled to a disk 154. The fan blades 152 and the disk 154 are rotatable, together, about the longitudinal centerline (axis) 101 by the LP shaft 109. The LP compressor 112 may also be directly driven by the LP shaft 109, as depicted in FIG. 1. The disk 154 is covered by a fan hub 156 aerodynamically contoured to promote an airflow through the plurality of fan blades 152. Further, a nacelle 160 circumferentially surrounds the fan 150, and, in the depicted embodiment, at least a portion of the turbo-engine 104. The nacelle 160 may also be referred to as an annular fan casing or an outer nacelle. The nacelle 160 is supported relative to the turbo-engine 104 and, more specifically, the outer casing 106 by a plurality of outlet guide vanes 158 that are circumferentially spaced about the nacelle 160 and the turbo-engine 104. A downstream section 162 of the nacelle 160 extends over an outer portion of the turbo-engine 104 and, more specifically, the outer casing 106 so as to define a bypass airflow passage 164 therebetween.

During operation of the turbine engine 100, a volume of air 166 enters the turbine engine 100 through an inlet of the nacelle 160 and/or the fan section 102 (referred to herein as an engine inlet 159). As the volume of air 166 passes across the fan blades 152, a first portion of air (bypass air 168) is directed or routed into the bypass airflow passage 164, and a second portion of air (core air 145) is directed or is routed into an upstream section of the core air flow path 140, or, more specifically, into the core inlet 141. The ratio between the bypass air 168 and the core air 145 is commonly known as a bypass ratio. Simultaneously with the flow of the core air 145 through the core air flow path 140 (as discussed above), the bypass air 168 is routed through the bypass airflow passage 164 before being exhausted from a bypass air discharge nozzle 169 of the turbine engine 100, also providing propulsive thrust. The bypass air discharge nozzle 169 and the core air exhaust nozzle 143 are air exhaust nozzles of the turbine engine 100.

The turbine engine 100 shown in FIG. 1 and discussed herein (turbofan engine) is provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, in other embodiments, the gas turbine engine may have other suitable configurations, such as other suitable numbers or arrangements of shafts, compressors, turbines, fans, etc. Further, although the turbine engine 100 is shown as a direct drive, fixed-pitch turbofan engine, in other embodiments, the turbine engine 100 may be a geared turbine engine (e.g., including a gearbox between the fan 150 and a shaft driving the fan 150, such as the LP shaft 109), may be a variable pitch turbine engine (i.e., including a fan 150 having a plurality of fan blades 152 rotatable about their respective pitch axes), etc. Further, still, in alternative embodiments, aspects of the present disclosure may be incorporated into, or otherwise utilized with, any other type of engine, such as reciprocating engines.

The turbine engine 100 discussed herein is suitable for use on aircraft. Suitable aircraft include, for example, airplanes, helicopters, and unmanned aerial vehicles (UAV). In other embodiments, the turbine engine may be any other turbine engines, such as an industrial turbine engine incorporated into a power generation system, a nautical turbine engine on a ship or other vessel.

Figure 2:
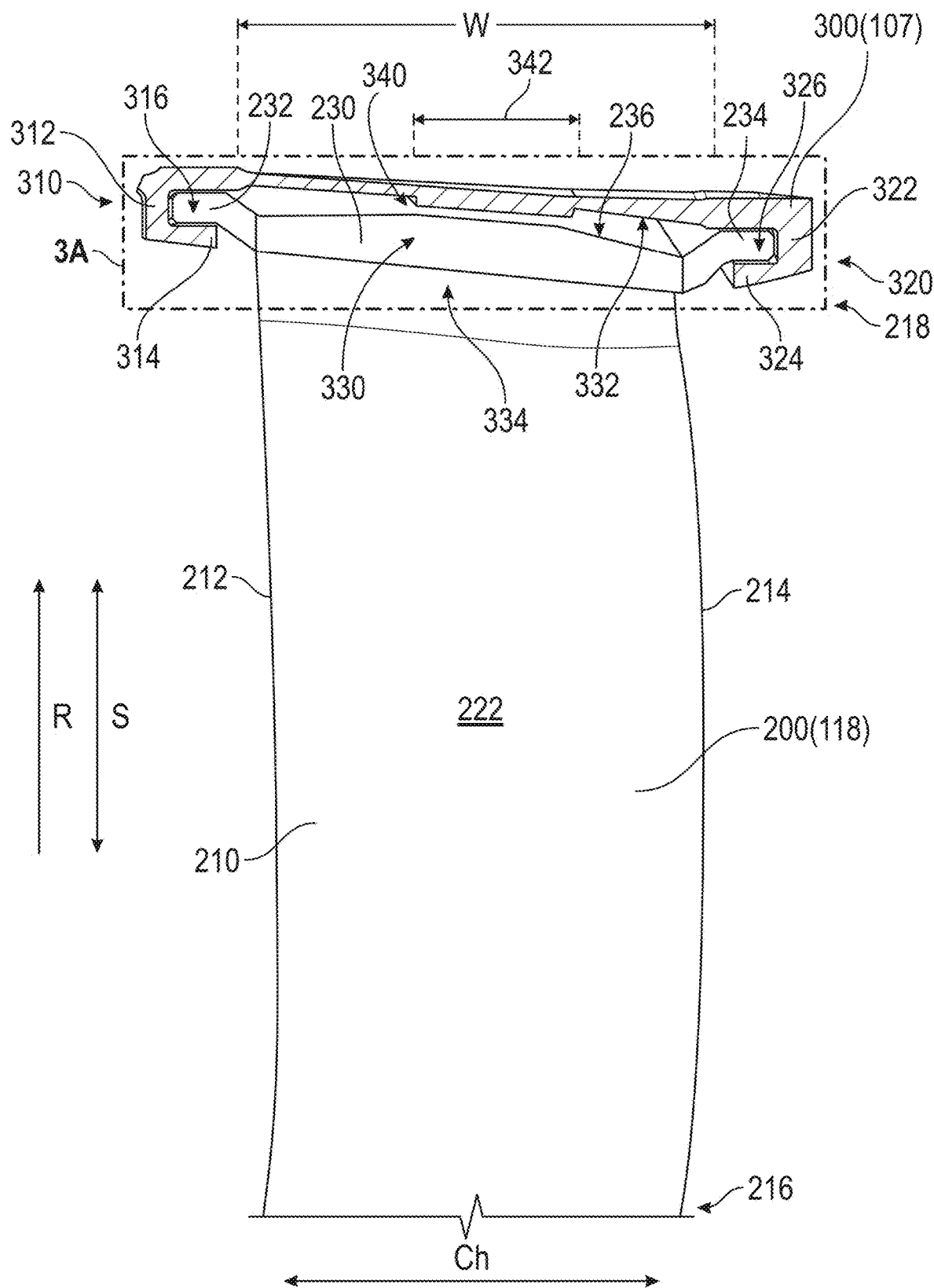
FIG. 2 is a detail, cross-sectional view of a compressor vane and a portion of a core casing in the turbine engine shown in FIG. 1.

FIG. 2 is a detail, cross-sectional view of a vane 200 mounted to a vane support 300. The vane support 300 can be case defining a portion of an air flow path. More specifically, FIG. 2 shows detail 2 in FIG. 1 with the vane 200 being the compressor vane 118 and the vane support 300 being a portion of the core casing 107. The compressor vane 118 is a static airfoil that may be formed from composite materials, such as PMC materials, for example, and is thus an example of a composite component. Although the following discussion refers to the compressor vane 118, the following discussion applies to other static airfoils and vanes of the turbine engine 100 (FIG. 1), including, for example, the outlet guide vanes 158 (FIG. 1). The vane 200 and methods of forming the same are suitable for these components, which may be PMC components. However, the vane 200 and methods discussed herein are also applicable to CMC components, including, for example, the turbine vanes 138

(FIG. 1). The vane 200 may be a polymer matrix composite component or a ceramic matrix composite component.

The vane 200 includes an airfoil 210 and an outer band 230. The airfoil 210 includes a leading edge 212, and a trailing edge 214, an inner end portion 216, and an outer end portion 218. The inner end portion 216 may be sized and shaped to form a seal with a rotor such as the HP shaft 108 or the LP shaft 109. The airfoil 210 extends outwardly in a radial direction R (FIG. 1) from the inner end portion 216 to the outer end portion 218. This direction may also be referred to as the spanwise direction S. The airfoil 210 includes surfaces formed on each side of the airfoil between the leading edge 212 and the trailing edge 214. These surfaces are a first surface 222 and a second surface 224 (FIG. 4B) positioned on opposite sides of the airfoil 210. As can be seen in FIG. 4B, the airfoil 210 is depicted herein as a symmetric airfoil, but the airfoil 210 may have any suitable shape, however, including, for example, concave surfaces, and the airfoil 210 may be a cambered airfoil with the first surface 222 being a suction surface having a convex curvature and the second surface 224 being a pressure surface that is generally flat. The airfoil 210 also includes a chordwise direction Ch, perpendicular to the spanwise direction S and extending from the leading edge 212 to the trailing edge 214. A thickness direction of the airfoil 210 is also perpendicular to each of the spanwise direction S and the chordwise direction Ch, and the thickness direction of the airfoil 210 extends in the circumferential direction C (FIG. 1) of the turbine engine 100 (FIG. 1).

The airfoil 210 and, more specifically, the outer end portion 218 is attached to an outer band 230. The outer band 230 connects and supports the airfoil 210 within the turbine engine 100 (FIG. 1). More specifically, the outer band 230 connects the airfoil 210 to a case, such as the core casing 107, defining the air flow passage in which the airfoil 210 is located. The case (e.g., the core casing 107) includes or is otherwise formed to be the vane support 300 to support the vane 200. The vane support 300 includes a first hook and a second hook. For ease of reference herein, the portions of the vane 200 and the vane support 300 are referred to using the directions and orientation of the turbine engine 100 depicted in FIG. 1, but other orientations may be used. The first hook is thus a forward hook 310 and the second hook is an aft hook 320. The vane support 300 also includes a vane-facing surface 332, and each of the forward hook 310 and the aft hook 320 extends from the vane-facing surface 332. Each of the forward hook 310 and the aft hook 320 has an L-shape as depicted in FIG. 2, but other shapes may be used. The forward hook 310 includes a first leg 312 and a second leg 314. The first leg 312 is directly attached to and extends from the vane-facing surface 332, and the second leg 314 extends from the first leg 312. The first leg 312, the second leg 314, and the vane-facing surface 332 collectively define a forward groove 316. Similarly, the aft hook 320 includes a first leg 322 and a second leg 324. The first leg 322 is directly attached to and extends from the vane-facing surface 332, and the second leg 324 extends from the first leg 322. The first leg 322, the second leg 324, and the vane-facing surface 332 collectively define an aft groove 326.

As depicted in FIG. 2, the forward hook 310 and the aft hook 320 extend radially inward from the vane-facing surface 332. The forward hook 310 and the aft hook 320 oppose each other and form a channel 330 therebetween. The vane-facing surface 332 defines a portion of the channel 330. The channel 330 has an opening 334 and a channel width W that is the distance of the opening 334 between the forward hook 310 and the aft hook 320. When assembled, the outer band 230 is positioned in the channel 330. The outer band includes a forward rail 232 (also referred to as a first rail) and an aft rail 234 (also referred to as a second rail). The forward rail 232 engages with the forward hook 310, and the aft rail 234 engages with the aft hook 320. More specifically, the forward rail 232 is positioned in the forward groove 316 to be positioned and supported radially by the second leg 314 and the vane-facing surface 332, and the aft rail 234 is positioned in the aft groove 326 to be positioned and supported radially by the second leg 324 and the vane-facing surface 332. The outer band 230 is supported axially by the first leg 312 of the forward hook 310 and the first leg 322 of the aft hook 320.

During assembly and during assembly conditions, the vane 200, and more specifically the outer band 230, is inserted into and positioned within the channel 330. To facilitate this process, the vane 200 and the vane support 300 are designed with clearances including a gap 340 between the vane-facing surface 332 and the outer band 230. The outer band 230 includes a support-facing surface 236, which, as depicted in FIG. 2, may be a radially outer surface of the outer band 230. The gap 340 is formed between the support-facing surface 236 and the vane-facing surface 332 under assembly conditions of the turbine engine 100 (FIG. 1). The assembly conditions, also referred to as-assembled conditions, may be taken when the turbine engine 100 and, more specifically, the turbo-engine 104 (FIG. 1) is not operating. In such a condition, the HP shaft 108 (FIG. 1) and the LP shaft 109 (FIG. 1) are stationary, and the temperature is an ambient temperature taken at seventy degrees Fahrenheit (70° F.) (twenty-one degrees Celsius (21° C.)). In some embodiments, the gap 340 can be from 0.005 inch to 0.040 inch, such as from 0.010 inch to 0.020 inch.

The turbine engine 100 may also have a primary operating condition. That is, the primary operating condition is a condition at which the vane 200 and the vane support 300 operate a majority of the time. This is the condition used for the standard operating condition. When the turbine engine 100 is used on an aircraft, the standard operating condition may be taken as the operating condition at cruise.

As noted above, the vane 200 may be a composite material, such as a PMC. The vane 200 is designed to operate, that is, resist operating stresses without failures over a life cycle. Accordingly, the vane 200 is designed to resist the stresses imparted to the vane 200 and various portions thereof, such as, for example, the forward rail 232 and the aft rail 234. Because composite materials are typically more flexible (less stiff) than metallic materials, the vane 200 may need to have increased thicknesses to resist the imparted stress during design operating conditions. These design operating conditions are high stress conditions of the turbine engine 100, such as stall, surge, high-G maneuvers, and take off conditions. Instead of increasing the rigidity of the vane 200, such as by increasing the thickness of the outer band 230, the vane 200 is allowed to flex under these operating conditions and at least a portion of the support-facing surface 236 contacts the vane-facing surface 332 over a contacting region 342 to eliminate the gap 340 over the contacting region 342. This configuration of the vane 200 with the vane support 300 under these high stress conditions is referred to herein as a contact configuration. The contact provides an additional load path for the stresses to be transferred from the vane 200 to the vane support 300 instead of only through the forward rail 232 and the aft rail 234, thereby reducing the stresses on the forward rail 232 and the aft rail 234.

Disclosed herein are several different configurations of the vane 200 and the vane support 300 to provide this additional load path for the vane 200. These configurations are discussed in more detail below. The vanes and the vane supports are similar among these different configurations and the same reference numerals will be used to refer to the same or similar components between these configurations. The discussion of a feature in one configuration may a apply to the discussion of another configuration and, although features are described separately, these features may be used interchangeably with each other. The discussion of the vane 200 and vane support 300 applies to each of these configurations.

FIGS. 3A and 3B are detail, cross-sectional views of the vane 200 (i.e., a first vane 201) and the vane support 300 (i.e., a first vane support 301) shown in FIG. 2, showing detail 3A in FIG. 2. FIG. 3A shows the first vane 201 under assembly conditions, and FIG. 3B shows the first vane 201 in a high stress condition and, more specifically, the contact configuration.

The first vane support 301 shown in FIGS. 3A and 3B includes a bumper that comes into contact with the outer band 230 in the contact condition. The bumper shown in FIG. 3A is a projection 350 projecting from the vane-facing surface 332 towards the outer band 230. The projection 350 includes a contact surface 352 that contacts the support-facing surface 236 of the outer band 230 in the contact configuration, as shown in FIG. 3B. The contact between the support-facing surface 236 and the contact surface 352 provides the additional load path from the first vane 201 to the first vane support 301. As noted above, the channel 330 includes a channel width W. The projection 350 may be located in a middle half of the channel width W (i.e., a quarter of the channel width W on either side of a centerline of the channel 330) and does not extend the full width (channel width W) of the channel 330. In the assembly condition, the gap 340 is thus not constant over the entire channel width W. Instead, the gap 340 includes a narrow region 344 between the contact surface 352 of the projection 350 and the support-facing surface 236. The narrow region 344 is a distance that is less than the distance between the support-facing surface 236 and the vane-facing surface 332 at other locations over the channel width without the projection 350.

The projection 350 can be integral with the first vane support 301, such as by being machined when the channel 330, the forward hook 310, and the second hook is an aft hook 320 are machined. Alternatively, the projection 350 can be separate component attached or otherwise bonded to the first vane support 301 and, more specifically, the vane-facing surface 332.

FIG. 4A is a detail, cross-sectional view of a second vane 202 and a second vane support 302. The cross-sectional view of FIG. 4A is similar to the similar to the cross-sectional view of FIG. 3A. FIG. 4B is a schematic view of the second vane 202. In FIGS. 2 to 3B, the projection 350 is integral with the first vane support 301. In FIG. 4A, the outer band 230 of the second vane 202 includes a projection 240 having a contact surface 242 formed thereon. The projection 240 is otherwise similar to the projection 350 discussed above with reference to FIGS. 3A and 3B. The airfoil 210 includes a chord length $L_{Ch}$ in the chordwise direction Ch (FIG. 2). The projection 240 may be located in a middle half of the chord length $L_{Ch}$.

As shown in FIG. 4B, the outer band 230 may be a plate structure extending in the circumferential direction C. The outer band 230 also includes a centerline 238 in the circumferential direction C, and the projection 240 is positioned such that the centerline 238 intersects the projection 240. Although other configurations may be used, as depicted in FIG. 4B, the airfoil 210 is offset in the circumferential direction C from the centerline 238 of the outer band 230.

FIG. 5 is a detail, cross-sectional view of a third vane 203 and a third vane support 303. The cross-sectional view of FIG. 5 is similar to the cross-sectional view of FIG. 3A. Similar to the projection 350 discussed above, the third vane support 303 shown in FIG. 5 includes a portion of the third vane support 303 that projects toward the outer band 230. This portion is a tapered portion 336 of the vane-facing surface 332. The distance between the vane-facing surface 332 and the support-facing surface 236 (i.e., the gap 340) progressively increases or decreases over the tapered portion 336. The tapered portion 336 is tapered in the chordwise direction Ch. Here, the tapered portion 336 is located closer to the forward hook 310 than the aft hook 320, and the gap 340 progressively increases in a direction from the forward hook 310 to the aft hook 320. Other arrangements, however, may be used, such as positioning the tapered portion 336 closer to the aft hook 320. The contact surface 352 is formed on the tapered portion 336.

FIG. 6 is a detail, cross-sectional view of a fourth vane 204 and a fourth vane support 304. The cross-sectional view of FIG. 6 is similar to the cross-sectional view of FIG. 3A. In FIG. 6, the vane-facing surface 332 and the support-facing surface 236 form mating surfaces in the contact configuration. Each of the vane-facing surface 332 and the support-facing surface 236 has a profile shape in cross section between the forward hook 310 and the aft hook 320. The profile shape of the support-facing surface 236 substantially corresponds to the profile shape of the vane-facing surface 332, and the profile shape of the vane-facing surface 332 mirrors the profile shape of the support-facing surface 236. Although other shapes may be used, the profile shape of the support-facing surface 236 and the profile shape of the vane-facing surface 332 are curvilinear with the gap 340 being a constant distance between the vane-facing surface 332 and the support-facing surface 236 over a majority of the distance of the channel width W.

The vanes 200 and the vane supports 300 are designed to allow the vane 200 to flex, such as when the vane 200 is formed from a composite material, and provide an additional load path under high stress (design) conditions.

Further aspects of the present disclosure are provided by the subject matter of the following clauses.

A turbine engine for an aircraft comprises a vane support including a vane-facing surface, a first hook, and a second hook, the first hook and the second hook extending from the vane-facing surface, the first hook and the second hook opposing each other and defining a channel therebetween, and a vane including an airfoil and an outer band attached to the airfoil, the outer band including a support-facing surface, a first rail, and a second rail, the outer band being positioned in the channel with the first rail engaging the first hook and the second rail engaging the second hook, the outer band being positioned in the channel to form a gap between the support-facing surface and the vane-facing surface under assembly conditions of the turbine engine, the vane-facing surface and the support-facing surface being shaped to form a contact configuration, in which, during flexing of the vane under an operating condition of the turbine engine, at least a portion of the support-facing surface contacts the vane-facing surface over a contacting region to eliminate the gap over the contacting region.

The turbine engine of the preceding clause, wherein the gap is present during a standard operating condition of the turbine engine.

The turbine engine of any preceding clause, wherein the contact configuration is present during a design operating condition of the turbine engine.

The turbine engine of any preceding clause, wherein the outer band has a circumferential direction and a centerline in the circumferential direction, the airfoil being offset in the circumferential direction from the centerline.

The turbine engine of any preceding clause, wherein the channel has an opening and a channel width that is the distance of the opening between the first hook and the second hook, and the gap is a constant distance between the vane-facing surface and the support-facing surface over a majority of the distance of the channel width.

The turbine engine of any preceding clause, wherein the vane is a composite component.

The turbine engine of any preceding clause, wherein the vane is a polymer matrix composite component.

The turbine engine of any preceding clause, wherein the vane is a ceramic matrix composite component.

The turbine engine of any preceding clause, wherein each of the vane-facing surface and the support-facing surface have a profile shape in cross section between the first hook and the second hook, the profile shape of the support-facing surface substantially corresponding to the profile shape of the vane-facing surface.

The turbine engine of any preceding clause, wherein the profile shape of the support-facing surface and the profile shape of the vane-facing surface is curvilinear.

The turbine engine of any preceding clause, wherein the airfoil has a chordwise direction, and each of the vane-facing surface and the support-facing surface has a profile shape in cross section between the first hook and the second hook, and one of the profile shape of the vane-facing surface or the profile shape of the support-facing surface is a tapered portion that is tapered in the chordwise direction.

The turbine engine of any preceding clause, wherein the channel has an opening and a channel width that is the distance of the opening between the first hook and the second hook, and, over at least a portion of the channel width, the gap progressively increasing or decreasing over the tapered portion.

The turbine engine of any preceding clause, wherein the vane-facing surface of the vane support includes the tapered portion.

The turbine engine of any preceding clause, wherein the vane support includes a projection projecting from the vane-facing surface towards the outer band, the projection including a contact surface contacting the support-facing surface in the contact configuration.

The turbine engine of any preceding clause, wherein the channel has an opening and a channel width that is the distance of the opening between the first hook and the second hook, and the projection is located in a middle half of the channel width.

The turbine engine of any preceding clause, wherein the outer band includes a projection projecting from the support-facing surface towards the vane-facing surface of the vane support, the projection including a contact surface contacting the vane-facing surface in the contact configuration.

The turbine engine of any preceding clause, wherein the airfoil has a chord length, and the projection is located in a middle half of the chord length.

The turbine engine of any preceding clause, wherein the outer band has a circumferential direction and a centerline in the circumferential direction, the centerline intersecting the projection.

The turbine engine of any preceding clause, wherein the vane support is a case defining a portion of an air flow path.

The turbine engine of any preceding clause, wherein the case is a core casing and the air flow path is a core air flow path.

The turbine engine of any preceding clause, further comprising a compressor forming a portion of the core air flow path, the compressor including the vane.

Although the foregoing description is directed to the preferred embodiments, other variations and modifications will be apparent to those skilled in the art and may be made without departing from the disclosure. Moreover, features described in connection with one embodiment may be used in conjunction with other embodiments, even if not explicitly stated above.

The invention claimed is:

1. A turbine engine for an aircraft, the turbine engine comprising:
   a vane support including a vane-facing surface, a first hook, and a second hook, the first hook and the second hook extending from the vane-facing surface, the first hook and the second hook opposing each other and defining a channel therebetween; and
   a vane including an airfoil and an outer band attached to the airfoil, the outer band including a support-facing surface, a first rail, and a second rail, the outer band being positioned in the channel with the first rail engaging the first hook and the second rail engaging the second hook,
   wherein the vane-facing surface and the support-facing surface are shaped to form a contact configuration in which, during flexing of the vane under a first condition of the turbine engine, at least a portion of the support-facing surface contacts the vane-facing surface over a contacting region, the first condition being an operating condition of the turbine engine, and
   wherein a gap is present between the support-facing surface and the vane-facing surface over the contacting region during a second condition of the turbine engine, the second condition being a non-operating condition of the turbine engine.

2. The turbine engine of claim 1, wherein the first condition is a design operating condition of the turbine engine, and
   wherein the gap is present during a third condition of the turbine engine, the third condition being a standard operating condition of the turbine engine.

3. The turbine engine of claim 1, wherein the outer band has a circumferential direction and a centerline, the airfoil being offset in the circumferential direction from the centerline.

4. The turbine engine of claim 1, wherein the channel has an opening and a channel width that is a distance of the opening between the first hook and the second hook, and
   wherein the gap is a constant distance between the vane-facing surface and the support-facing surface over a majority of the distance of the channel width.

5. The turbine engine of claim 1, wherein each of the vane-facing surface and the support-facing surface has a profile shape in cross section between the first hook and the second hook, the profile shape of the support-facing surface corresponding to the profile shape of the vane-facing surface.

6. The turbine engine of claim 5, wherein the profile shape of the support-facing surface and the profile shape of the vane-facing surface are curvilinear.

7. The turbine engine of claim 1, wherein the vane support includes a projection projecting from the vane-facing surface towards the outer band, the projection including a contact surface contacting the support-facing surface in the contact configuration.

8. The turbine engine of claim 7, wherein the channel has an opening and a channel width that is a distance of the opening between the first hook and the second hook, and the projection is located in a middle half of the channel width.

9. The turbine engine of claim 1, wherein the vane is a composite component.

10. The turbine engine of claim 9, wherein the vane is a polymer matrix composite component.

11. The turbine engine of claim 9, wherein the vane is a ceramic matrix composite component.

12. The turbine engine of claim 1, wherein the airfoil has a chordwise direction, and wherein each of the vane-facing surface and the support-facing surface has a profile shape in cross section between the first hook and the second hook, and one of the profile shape of the vane-facing surface or the profile shape of the support-facing surface is a tapered portion that is tapered in the chordwise direction.

13. The turbine engine of claim 12, wherein the channel has an opening and a channel width that is a distance of the opening between the first hook and the second hook, and wherein, over at least a portion of the channel width, the gap progressively increases or decreases over the tapered portion.

14. The turbine engine of claim 12, wherein the vane-facing surface of the vane support includes the tapered portion.

15. The turbine engine of claim 1, wherein the outer band includes a projection projecting from the support-facing surface towards the vane-facing surface of the vane support, the projection including a contact surface contacting the vane-facing surface in the contact configuration.

16. The turbine engine of claim 15, wherein the airfoil has a chord length, and the projection is located in a middle half of the chord length.

17. The turbine engine of claim 15, wherein the outer band has a circumferential direction and a centerline in the circumferential direction, the centerline intersecting the projection.

18. The turbine engine of claim 1, wherein the vane support is a case defining a portion of an air flow path.

19. The turbine engine of claim 18, wherein the case is a core casing and the air flow path is a core air flow path.

20. The turbine engine of claim 19, further comprising a compressor forming a portion of the core air flow path, the compressor including the vane.

* * * * *